United States Patent

Siemensmeyer et al.

[11] Patent Number: 5,820,783
[45] Date of Patent: *Oct. 13, 1998

[54] CHIRAL COMPOUNDS

[75] Inventors: Karl Siemensmeyer, Frankenthal; Volkmar Vill, Muenster; Hanns-Walter Tunger; Matthias Paul, both of Hamburg, all of Germany

[73] Assignee: BASF Aktiengesellschaft, Ludwigshafen, Germany

[ * ] Notice: The term of this patent shall not extend beyond the expiration date of Pat. No. 5,709,817.

[21] Appl. No.: 902,289

[22] Filed: Jul. 29, 1997

Related U.S. Application Data

[63] Continuation of Ser. No. 562,466, Nov. 24, 1995, Pat. No. 5,709,817.

[30] Foreign Application Priority Data

Nov. 30, 1994 [DE] Germany .................... 44 42614.3

[51] Int. Cl.$^6$ .......................... C09K 19/34; C07D 309/10
[52] U.S. Cl. ................ 252/299.61; 252/299.63; 549/416; 549/420; 549/421
[58] Field of Search .............. 252/299.61, 299.63; 549/420, 421, 416, 370

[56] References Cited

U.S. PATENT DOCUMENTS 5,709,817  1/1998  Siemensmeyer et al. ......... 252/299.61

FOREIGN PATENT DOCUMENTS 630892  12/1994  European Pat. Off. .

OTHER PUBLICATIONS

CA 123: 184122, 1995.
CA 124: 161105, 1995.

*Primary Examiner*—Shean C. Wu
*Attorney, Agent, or Firm*—Oblon, Spivak, McClelland, Maier & Neustadt, P.C.

[57] ABSTRACT

Chiral compounds of the formula I

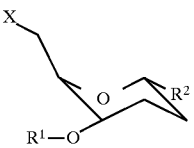

where $R^1$ is hydrogen or $-Y-Z-Y^1$, $R^2$ is

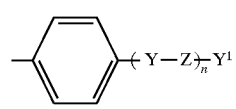

and X is hydrogen, fluorine, chlorine, bromine, iodine, hydroxyl or $OR^1$, where Y is a direct bond, CO or $C_2$- to $C_8$-alkylene in which nonadjacent carbon atoms may be replaced by O, CO, COO or OCO, Z is a group containing one or more saturated or unsaturated carbocyclic or heterocyclic rings, $Y^1$ is $C_1$- to $C_{15}$-alkyl, $C_2$- to $C_{15}$-alkenyl, $C_1$- to $C_{15}$-alkoxy, $C_2$- to $C_{15}$-alkenyloxy, $C_1$- to $C_{15}$-alkanoyloxy or $C_3$- to $C_{15}$-alkenoyloxy, it being possible for nonadjacent carbon atoms in these radicals to be replaced by oxygen, OCO or COO, and n is 0, 1 or 2.

8 Claims, No Drawings

CHIRAL COMPOUNDS

This is a Continuation of application Ser. No. 08/562,466 filed on Nov. 24, 1995, now U.S. Pat. No. 5,709,817.

It is known that media which are anisotropic in shape can form liquid-crystalline phases, known as mesophases, on warming. The individual phases differ through the spatial arrangement of the major parts of the molecules on the one hand and through the molecular arrangement with respect to the long axes on the other hand (G. W. Gray, P. A. Winsor, Liquid Crystals and Plastic Crystals, Ellis Horwood Limited, Chichester, 1974). The nematic liquid-crystalline phase is distinguished by the fact that there is only one alignment long-distance order due to the long molecular axes lining up in parallel. Under the prerequisite that the molecules making up the nematic phase are chiral, a cholesteric phase forms, in which the long axes of the molecules form a helical superstructure perpendicular thereto (H. Baessler, Festkörperprobleme XI, 1971). The chiral moiety may be present in the liquid-crystalline molecule itself or added to the nematic phase as a dope, inducing the cholesteric phase. This phenomenon was first studied on cholesterol derivatives (for example H. Baessler, M. M. Labes, J. Chem. Phys., 52 (1970) 631; H. Baessler, T. M. Laronge, M. M. Labes, J. Chem. Phys., 51 (169) 799; H. Finkelmann, H. Stegemeyer, Z. Naturforschg. 28a (1973) 799; H. Stegemeyer, K. J. Mainusch, Naturwiss., 58 (1971) 599, H. Finkelmann, H. Stegemeyer, Ber. Bunsenges. Phys. Chem. 78 (1974) 869).

The cholesteric phase has remarkable optical properties: large optical rotation and pronounced circular dichroism caused by selective reflection of circular-polarized light within the cholesteric layer. The different colors to be observed depending on the viewing angle depend on the pitch of the helical super-structure, which is itself dependent on the twisting power of the chiral component. The pitch and thus the wavelength range of the selectively reflected light of a cholesteric layer can be varied, in particular, by changing the concentration of a chiral dope. Such cholesteric systems offer interesting opportunities for practical use. Thus, incorporation of chiral moieties into mesogenic acrylic esters after establishment of the cholesteric alignment and photocrosslinking can give a stable, colored network, but the concentration of the chiral component therein cannot be changed (G. Galli, M. Laus, A. Angelon, Makromol. Chemie, 187 (1986) 289). Furthermore, admixing of non-crosslinkable, chiral compounds with nematic acrylic esters after photocross-linking can give a colored polymer, but this still contains a high proportion of soluble components (I. Heyndricks, D. J. Broer, Mol. Cryst. Liq. Cryst. 203 (1991) 113).

In a similar manner, random hydrosilylation of cholesterol derivatives and acrylate-containing mesogens by means of defined cyclic siloxanes after photopolymerization allows the preparation of a cholesteric network. The chiral component here contains up to 50% of the starting materials, causing the formation of a significant soluble content (F. H. Kreuzer, R. Maurer, C. Müller-Rees, J. Stohrer, Lecture No. 7, 22nd Freiburg Congress on Liquid Crystals, Freiburg, 1993). DE-A 35 35 547 describes a process in which a mixture of cholesterol-containing monoacrylates can be converted into cholesteric layers by photocrosslinking. However, the total content of the chiral component in the mixture is about 94%. As a pure side-chain polymer, such a material is not very mechanically stable, but stability can be achieved by highly crosslinking diluents.

In addition to the nematic and cholesteric networks described above, smectic networks are also known. These are prepared, in particular, by photopolymerization/photocrosslinking of smectic liquid-crystalline materials in the smectic liquid-crystalline phase. The materials used for this purpose are generally symmetrical, liquid-crystalline bisacrylates, as described, for example, in D. J. Broer, R. A. M. Hikmet, Makromol. Chem., 190 (1989) 3201. However, these compounds have very high clearing points of >120° C., and therefore run the risk of thermal polymerization. Admixing non-polymerizable chiral materials if a $S_C^*$ phase is present makes it possible for piezoelectric properties to appear in the resultant network (R. A. M. Hikmet, Macromolecules, 25 (1992) 5759).

It is desirable for the use of chiral components in LC mixtures to have available very high-twist compounds in order to keep the proportion of these compounds in the mixture as a whole very low and avoid changing other properties too much. Furthermore, the chiral components should be readily soluble in the liquid-crystalline host phase.

It is an object of the present invention to prepare novel chiral compounds which cause high twist and if possible—in order to increase the solubility—themselves have a liquid-crystalline phase.

We have found that this object is achieved by novel compounds of the formula I

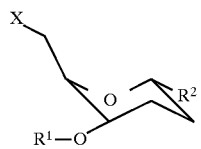

where $R_1$ is hydrogen or $-Y-Z-Y^1$, $R^2$ is

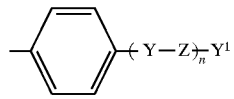

and

X is hydrogen, fluorine, chlorine, bromine, iodine, hydroxyl or $OR^1$, where

Y is a direct bond, CO or $C_2$ to $C_8$-alkylene, which may be interrupted by O, COO or OCO, Z is a group containing one or more saturated or unsaturated carbocyclic or heterocyclic rings, $Y^1$ is $C_1$- to $C_{15}$-alkyl, $C_2$- to $C_{15}$-alkenyl, $C_1$- to $C_{15}$-alkoxy, $C_2$- to $C_{15}$-alkenyloxy, $C_1$- to $C_{15}$-alkanoyloxy or $C_3$- to $C_{15}$-alkenoyloxy, each of which may be interrupted by oxygen, OCO or COO, and n is 0, 1 or 2.

Examples of radicals Z are:

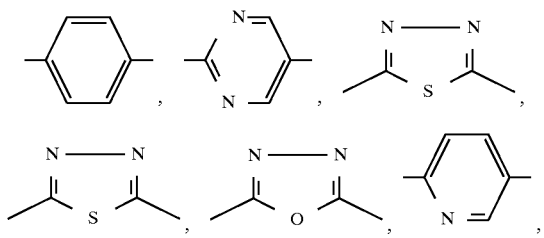

-continued

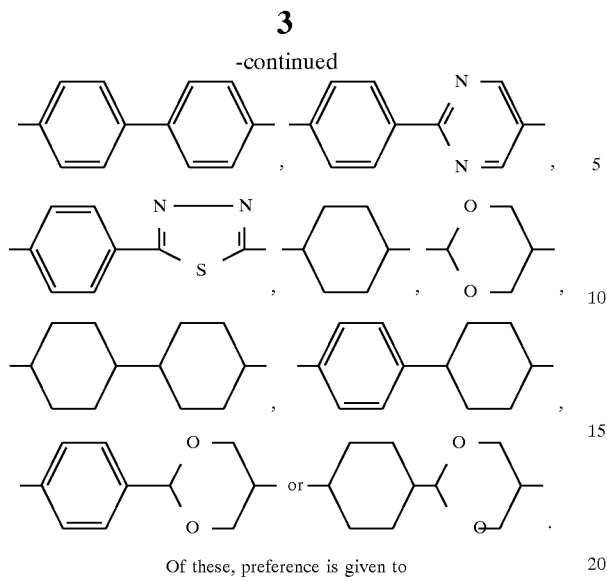

Of these, preference is given to

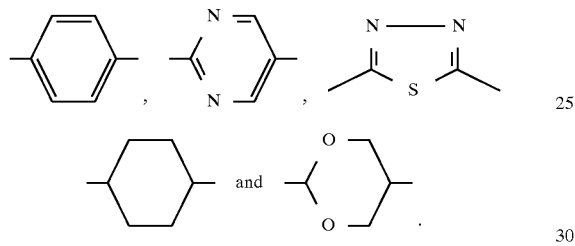

Particular preference is given to

Examples of suitable bridges Y are the following:
—$C_2H_4$—, —$C_3H_6$—, —$C_4H_8$—, —$C_5H_{10}$—, —$C_6H_{12}$—, —$C_7H_{14}$—, —$C_8H_{16}$—,

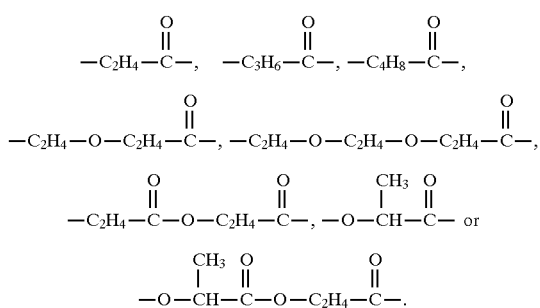

The bridge Y is preferably a direct bond, CO or $C_1$–$C_8$-alkylene in which nonadjacent carbon atoms may be replaced by O, CO, COO or OCO, particularly preferably

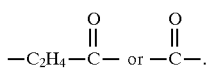

$Y^1$ is preferably $C_1$–$C_{15}$-alkyl, $C_1$–$C_{15}$-alkoxy, $C_2$–$C_{15}$-alkenyl, $C_2$–$C_{15}$-alkenyloxy, acryloyloxy or methacryloyloxy, for example, one of the following groups:
—$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$, —$C_{15}H_{31}$, —$OCH_3$, —$OC_2H_5$, $OC_3H_7$, $OC_4H_9$, $OC_5H_{11}$, $OC_6H_{13}$, $OC_8H_{17}$, $OC_9H_{19}$, $OC_{10}H_{21}$, $OC_{13}H_{27}$, $OC_{14}H_{29}$, —O—$C_{15}H_{31}$,

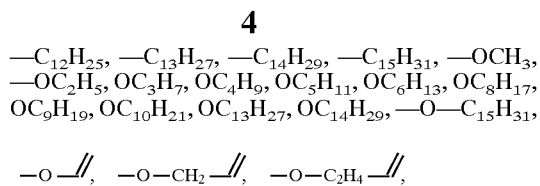

and the remainder of the series to

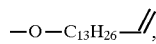

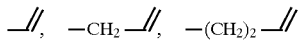

and the remainder of the series to

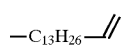

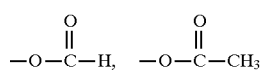

and the remainder of the series to

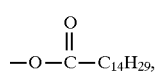

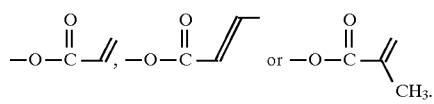

$Y^1$ is particularly preferably an alkyl or alkoxy radical as described above or

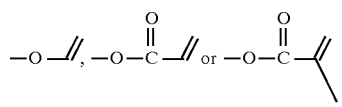

n is preferably zero or one, particularly preferably 0.

The compounds of the formula I can be prepared by methods known per se.

Details of the preparation are given in the examples. Some of the compounds of the formula I are liquid-crystalline and, depending on the structure, can form chiral smectic or chiral nematic phases. They are miscible, in particular, with other liquid-crystalline, calamitic compounds. The compounds of the formula I and mixtures containing same are suitable for all purposes for which liquid-crystalline compounds or mixtures are usually used.

In order to establish desired properties of mixtures, it may be expedient to use more than two compounds of the formula I or mixtures with other polymerizable liquid crystals, it being possible for these mixtures to be prepared in situ or by mechanical mixing. The setting of the phase state ranges can also be achieved, in particular, by adding non-liquid-crystalline polymerizable components, known as reactive thinners, for example hexanediol diacrylate or bisphenol A diacrylate, which are only mentioned here by way of example. The novel compounds are particularly suitable as alignment layers for liquid-crystalline materials, as photocrosslinkable adhesives, as monomers for the production of liquid-crystalline networks, as base materials for the production of polymerizable liquid-crystal systems which can be doped with chiral dopes, and as polymerizable or liquid-crystalline materials for optical components, such as polarizers, retardation plates or lenses.

Furthermore, the novel compounds can be used, alone or mixed with other liquid-crystalline or non-liquid-crystalline compounds, as a constituent of cholesteric liquid-crystalline coating compositions, for example emulsions or other paints or printing inks. Cholesteric liquid-crystalline coatings of this type, which also contain, if desired, polymerizable systems, exhibit interesting color effects with a viewing angle-dependent color impression.

EXAMPLES

The following are some abbreviations used throughout the examples:

C crystalline phase
Ch cholesteric phase
$S_a$ smectic A phase
I isotropic phase The phase transition temperatures were measured under a polarizing microscope. Temperature control was effected in a Mettler FP80/82 microscope heating stage.

PE=petroleum ether (60° to 90° C.)
EA=ethyl acetate
tol.=toluene

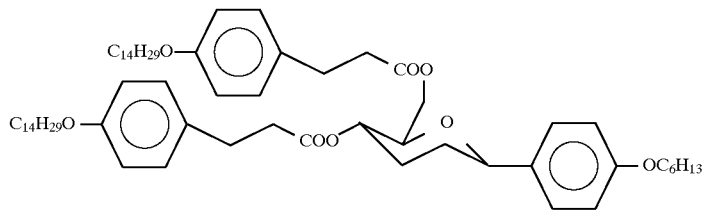

The precursors for Examples 1 to 12 are prepared as follows:

The starting material used in each case is the compound of the formula

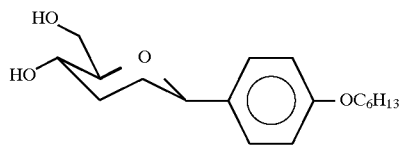

=1'-(2,3-didesoxy-β-D-erythrogllucopyranosyl)-4-'-hexoxybenzene, referred to as (1) below:

Precursor for Example 1

100 mg (0.32 mmol) of 1'-(2,3-didesoxy-β-D-erythrohexopyranosyl)-4'-hexoxybenzene (1) are dissolved in 5 ml of pyridine, and 100 mg (0.52 mmol) of p-toluenesulfonyl chloride in 5 ml of dichloromethane are added. After two hours, 2 ml of water are added, the mixture is left to stand for 30 minutes at 0° C., the phases are separated, the organic phase is washed with saturated sodium hydrogen carbonate solution and dried over magnesium sulfate, and the solvent is removed in vacuo. The crude product is purified by column chromatography. Yield: 68 mg (46%).

1'-(2,3-didesoxy-6-toluenesulfonyl-β-D-erythrohexoxybenzene (68 mg, 0.15 mmol) is dissolved in 15 ml of tetrahydrofuran, the solution is cooled to 0° C., 6 mg (0.15 mmol) of lithium aluminum hydride are added, and the mixture is warmed to room temperature and refluxed for 8 hours. After the mixture has been cooled and excess reagent has been destroyed by means of ethyl acetate, the mixture is filtered through Celite®, the solvent is evaporated in vacuo and the product is purified by column chromatography.

Yield: 26 mg (60%).

The product has the formula (2)

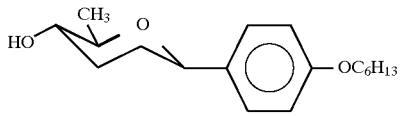

Precursor for Example 2
1-(6-Fluoro-2,3,6-tridesoxy-β-D-erythrohexopyranosyl)-4'-heoxybenzene (3)

A solution of (1) (255 mg, 0.83 mmol) in $CH_2Cl_2$ (1 ml, dry) is added to a cooled (−10° C.) and stirred solution of diethylaminosulfur trifluoride (0.4 ml, 3.31 mmol) in $CH_2Cl_2$ (1 ml). The temperature is slowly increased to room temperature over the course of one hour. The reaction mixture is poured onto ice, and the aqueous phase is extracted by shaking three times with 5 ml of $CH_2Cl_2$. The combined organic phases are evaporated under reduced pressure. The resultant syrup is worked up by column chromatography (eluent PE: EA 4:1). The product is obtained in a yield of 7.4 mg (3%).

$R_f$ value: 0.36 (in tol.: EA 1:1).

The product has the formula (3)

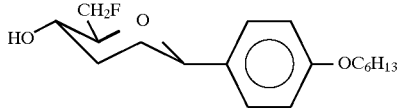

Precursor for Example 3
1'-(6-Chloro-2,3,6-tridesoxy-β-D-erythrohexopyranosyl)-4'-heoxybenzene (1) (50.3 mg, 0.16 mmol) is dissolved in DMF (2 ml), and mesyl chloride (60 mg, 0.52 mmol) is added. The mixture is then warmed to 80° C. After one hour, the solvent is stripped off. The residue is taken up in methanol (5 ml), and a spatula tip of sodium methoxide is added. The batch is stirred at room temperature for 3 hours. Acidic ion exchanger is added, and the mixture is stirred for a further half an hour. The mixture is filtered, and the solvent is stripped off under reduced pressure. The resultant syrup is worked up by column chromatography (eluent tol.: EA 4:1). The product (4) is obtained in a yield of 34.4 mg (64%).

$R_f$ value: 0.52 (in tol.: EA 1:1).

Compound (4) carries Cl instead of the F in the formula (3).

Precursor for Example 4
1'-(6-Bromo-2,3,6-tridesoxy-β-D-erythrohexopyranosyl)-4'-heoxybenzene (5)

A solution of triphenylphosphine (85.6 mg, 0.33 mmol) in DMF (1 ml) is added over the course of 5 minutes to a cooled solution (0° C.) of (1) (50.3 mg, 0.16 mmol) and NBS (58.1 mg, 0.33 mmol). After the addition, the batch is heated at 50° C. for two hours. The solvent is stripped off under reduced pressure, and the resultant syrup is worked up by column chromatography (eluent PE: EA 4:1). The product (5) is obtained in a yield of 29.3 mg (48%).

$R_f$ value: 0.38 (in tol.: EA 1:1); $[\alpha]_D^{20}=+36°$ (c=1.06 in $CH_2Cl_2$);

Compound (5) carries Br instead of the F in the formula (3).

Precursor for Example 5
1'-(6-Iodo-2,3,6-tridesoxy-β-D-erythrohexopyranosyl)-4'-heoxybenzene (6)

A mixture of (1) (30.8 mg, 0.1 mmol), triphenylphosphine (39.3 mg, 0.15 mmol), imidazole (20.4 mg, 0.3 mmol) and iodine (35.5 mg, 0.14 mmol) in toluene (2 ml, abs.) is stirred vigorously for ½ hour at 70° C. The reaction mixture is cooled, an equal part of saturated sodium hydrogen carbonate solution is added, and the mixture is stirred for 5 minutes. Iodine is then added until the toluene phase remains iodine colored. The mixture is stirred for a further 10 minutes. The excess iodine is removed by aqueous thiosulfate solution. The reaction solution is transferred into a separating funnel and the organic phase is diluted with toluene. After separation, the organic phase is extracted with water, dried over magnesium sulfate, filtered and concentrated. The resultant residue is worked up by column chromatography (eluent PE: EA 4:1). The product (6) is obtained in a yield of 22.3 mg (53%).

$R_f$ value: 0.47 (in tol.: EA 1:1)

Compound (6) carries I instead of the F in the formula (3).

Precursor for Example 6
1'- (6-O-tert-Butyldimethylsilyl-2,3-didesoxy-β-D-erythrohexopyranosyl)-4'-hexoxybenzene (7)

tert-Butyldimethylsilyl chloride (166 mg, 1.10 mmol) is added to a solution of (1) (300 mg, 0.97 mmol) in pyridine (4 ml). The batch is left to stand at room temperature for 3 hours. The solvent is stripped off under reduced pressure. In order to expel adhering pyridine, toluene is added and stripped off three times. The residue is taken up in $CH_2Cl_2$, dried over magnesium sulfate, filtered and evaporated, giving the compound (7) in a yield of 37.8 mg (92%).

$R_f$ value: 0.62 (in tol.: EA 2:1)

Compound (7) carries a group of the formula

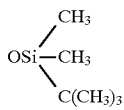

instead of the F in the formula (3).

General procedure for the preparation of the compounds of Examples 1 to 12:

A solution of the carboxylic acid $R^1$-OH (1 part), N,N-dicyclohexylcarbodiimide (1.1 parts), the alcohol [compounds (1) to (7)] (1.1 parts) and 4-dimethylaminopyridine (1 part) in dichloromethane is left to stand at room temperature until the esterification is complete (about 2–3 days).

The solvent is stripped off in vacuo, and the residue is worked up by column chromatography using a petroleum ether/ethyl acetate mixture.

EXAMPLE 1

1'-(4-O-p-Octyloxybenzoyl-2,3,6-tridesoxy-β-D-erythrohexopyranosyl)-4'-hexoxybenzene

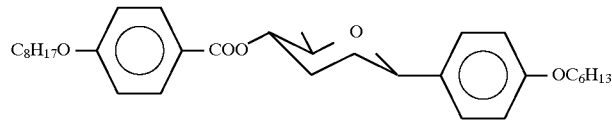

0.018 mmol of octyloxybenzoic acid and 0.02 mmol of compound (1) were reacted as described in the procedure above. The eluent used was a PE:EA 20:1 mixture.

The product was obtained in a yield of 5 mg (40%).

$R_f$ value: 0.85 (in tol.:EA 8:1); $[\alpha]_D^{20}=+35°$ (c=0.28 in $CH_2Cl_2$);

Phase behavior: c 45.4 Ch 86.6 I

EXAMPLE 2

1'-(6-Fluoro-4-O-p-octyloxybenzoyl-2,3,6-tridesoxy-β-D-erythrohexopyranosyl)-4'-hexoxybenzene

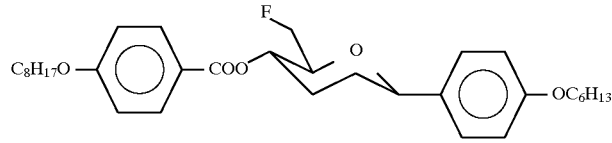

0.018 mmol of octyloxybenzoic acid and 0.02 mmol of compound (3) were reacted by a method similar to that of Example 1. The eluent used was a PE:EA 9:1 mixture.

The product was obtained in a yield of 1.5 mg (12%).

$R_f$ value: 0.86 (in tol.:EA 8:1)

The compound has green/blue selective reflection between 51° C. and 64.1° C. Phase behavior: C 51.0 Ch 64.1 I

EXAMPLE 3
1'-(6-Chloro-4-O-p-octyloxybenzoyl-2,3,6-tridesoxy-β-D-erythrohexopyranosyl)-4'-hexoxybenzene

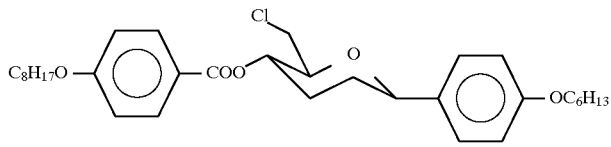

0.1 mmol of octyloxybenzoic acid and 0.11 mmol of compound (4) were reacted by a method similar to that of Example 1. The eluent used was a PE:EA 11:1 mixture.

The product was obtained in a yield of 19.3 mg (33%).

$R_f$ value: 0.89 (in tol.:EA 8:1); $[\alpha]_D^{20}$=+27° (c=1.17 in $CH_2Cl_2$);

On cooling, the compound has green/blue reflection below 38.5° C. Phase behavior: C 47.5 (Ch 38.8) I

EXAMPLE 4
1'-(6-Bromo-4-O-p-octyloxybenzoyl-2,3,6-tridesoxy-β-D-erythrohexopyranosyl)-4'-hexoxybenzene

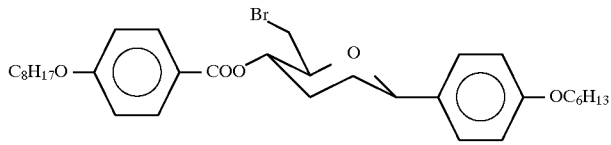

0.036 mmol of octyloxybenzoic acid and 0.04 mmol of compound (5) were reacted by a method similar to that of Example 1. The eluent used was a PE:EA 20:1 mixture.

The product was obtained in a yield of 11.2 mg (47%).

$R_f$ value: 0.88 (in tol.:EA 8:1); $[\alpha]_D^{20}$=+43° (c=1.14 in $CH_2Cl_2$); Phase behavior: C 50.0 (Ch 33.8) I

EXAMPLE 5
1'-(6-Iodo-4-O-p-octyloxybenzoyl-2,3,6-tridesoxy-β-D-erythrohexopyranosyl)-4'-hexoxybenzene

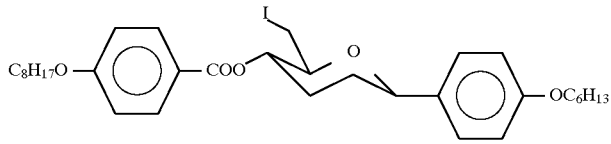

0.045 mmol of octyloxybenzoic acid and 0.05 mmol of compound (6) were reacted by a method similar to that of Example 1. The eluent used was a PE:EA 8:1 mixture.

Yield: 11 mg (37%); $R_f$ value: 0.91 (in tol.:EA 4:1); $[\alpha]_D^{20}$=+46° (c=0.91 in $CH_2Cl_2$); Phase behavior: C 63.9 (Ch 27.3) I

EXAMPLE 6
1'-(4-O-p-Octyloxybenzoyl-2,3-didesoxy-β-D-erythrohexopyranosyl)-4'-hexoxybenzene

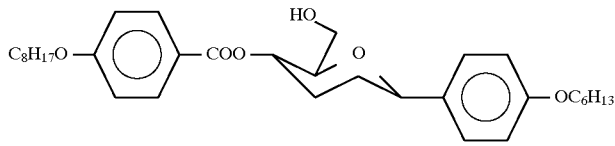

The compound is prepared by a method similar to that of Example (1) by reacting 0.90 mmol of Compound 7 and 0.81 mmol of octyloxybenzoic acid. A product mixture was obtained comprising the compound of Example 7 and the compound of Example 6 protected by a butyldimethylsilyl group. The mixture was separated by chromatography using PE:EA 8:1 as eluent.

In order to remove the butyldimethylsilyl protecting group, methanol (5 ml) and Amberlite® A-26 (H⁺) were added to the solution of 28.4 mg (0.04 mmol) of 1'-(6-O-tert-butyldimethylsilyl-4-O-p-octyloxybenzoyl-2,3-didesoxy-β-D-erythrohexopyranosyl)-4'-heoxybenzene in $CH_2Cl_2$ (5 ml). The batch was stirred at room temperature for 3 days, the ion exchanger was filtered off, and the solution was evaporated. The residue was worked up by column chromatography (eluent PE:EA 8:1).

The product was obtained in a yield of 13.4 mg (57%).

$R_f$ value: 0.10 (in tol.:EA 6:1); $[\alpha]_D^{20}=+23°$ (c=1.10 in $CH_2Cl_2$); Phase behavior: C 42.0 (Ch 59.0) I

EXAMPLE 7
1'-(4,6-Di-O-p-octyloxybenzoyl-2,3-didesoxy-β-D-erythrohexopyranosyl)-4'-hexoxybenzene

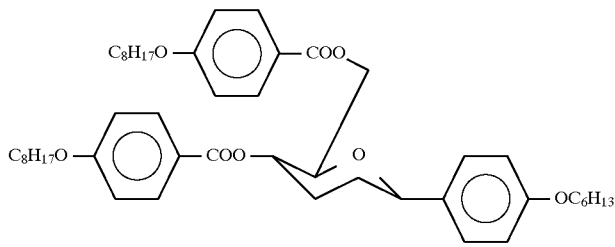

The product was obtained in a yield of 201.0 mg (29%).
$R_f$ value: 0.52 (in tol.:EA 4:1); $[\alpha]_D^{20}=+52°$ (c=1.02 in $CH_2Cl_2$); Phase behavior: C 59.4 (Ch 32.1) I

EXAMPLE 8
1'-(4-O-(3-(p-Tetradecyloxyphenyl)propionyl)-2,3-didesoxy-β-D-erythrohexopyranosyl)-4'-hexoxybenzene

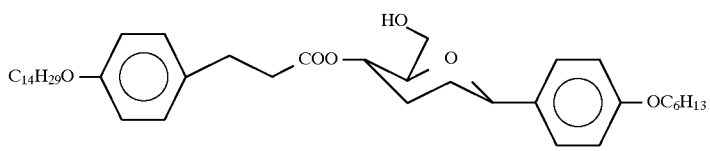

The compounds of Examples 8, 9 and 10 were prepared by a method similar to that of Example 1 by reacting 0.4 mmol of 3-(p-tetradecyloxyphenyl)propionic acid with 0.22 mmol of compound (1). The compounds of Examples 8, 9 and 10 were separated by chromatography using a PE:EA 12:1 mixture as eluent.

The product was obtained in a yield of 51 mg (35%).

$R_f$ value: 0.40 (in tol.:EA 4:1); $[\alpha]_D^{20}=+20°$ (c=0.55 in $CH_2Cl_2$); Phase behavior: C 84.8 ($S_A$ 52.0) I

EXAMPLE 9

1'-(6-O-(3-(p-Tetradecyloxyphenyl)propionyl)-2,3-didesoxy-β-D-erythrohexopyranosyl)-4'-hexoxybenzene

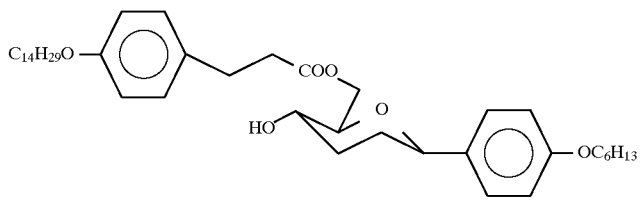

The product was obtained in a yield of 78 mg (53%).
$R_f$ value: 0.25 (in tol.:EA 4:1); $[\alpha]_D^{20}=-7°$ (c=1.18 in $CH_2Cl_2$); Phase behavior: C 68.0 I

EXAMPLE 10
1'-(4,6-Di-O-(3-(p-tetradecyloxyphenyl)propionyl-2,3-didesoxy-β-D-erythrohexopyranosyl)-4'-hexoxybenzene

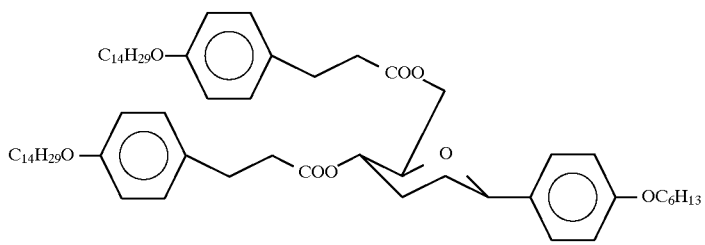

The product was obtained in a yield of 5 mg (2%).
$R_f$ value: 0.51 (in tol.:EA 4:1); $[\alpha]_D^{20}=+20°$ (c=0.7 in $CH_2Cl_2$); Phase behavior: C 72.0 I

EXAMPLE 11
1'- (4-O-p-Tetradecyloxybenzoyl-6-O-(3-(p-tetradecyloxyphenyl)-propionyl)-2,3-didesoxy-β-D-erythrohexopyranosyl)-4'-hexoxybenzene

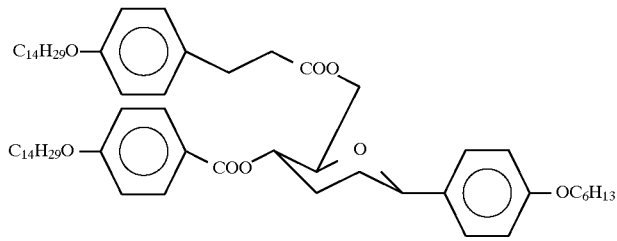

The compound of Example 11 was prepared by a method similar to that of Example 1 by reacting 0.4 mmol of the compound from Example 9 with 0.036 mmol of p-tetradecyloxybenzoic acid. The eluent used was PE:EA 8:1.

The product was obtained in a yield of 6.1 mg (17%).
$R_f$ value: 0.94 (in tol.:EA 4:1); $[\alpha]_D^{20}=+30°$ (c=0.61 in $CH_2Cl_2$); Phase behavior: C 79.3 ($S_A$ 61.2) I

EXAMPLE 12
1'-(6-O-p-Tetradecyloxybenzoyl-4-O-(3-(p-tetradecyloxyphenyl)-propionyl)-2,3-didesoxy-β-D-erythrohexopyranosyl)-4'-hexoxybenzene

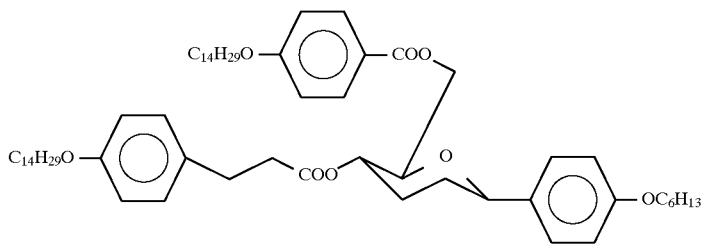

0.009 mmol of tetradecyloxybenzoic acid and 0.01 mmol of the compound from Example 8 were reacted by a method similar to that of Example 1. The eluent used was a PE:EA 8:1 mixture.

The product was obtained in a yield of 3.8 mg (58%).

$R_f$ value: 0.83 (in tol.:EA 4:1); Phase behavior: C 72.4 I

We claim:

1. A chiral compound of the formula I

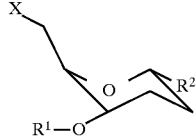

where $R^1$ is hydrogen or —Y—Z—$Y^1$, $R^2$ is

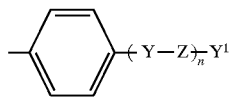

and

X is hydrogen, fluorine, chlorine, bromine, iodine, hydroxyl or $OR^1$, where

Y is a direct bond, CO or $C_2$- to $C_8$-alkylene in which nonadjacent carbon atoms may be replaced by O, CO, COO or OCO, Z is

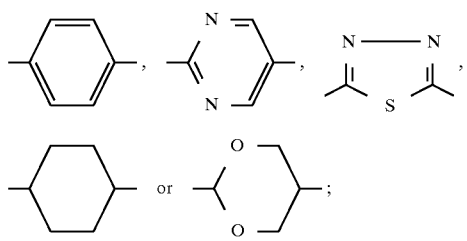

$Y^1$ is $C_1$- to $C_{15}$-alkyl, $C_2$- to $C_{15}$-alkenyl, $C_1$- to $C_{15}$-alkoxy, $C_2$ to $C_{15}$-alkenyloxy, it being possible for nonadjacent carbon atoms in these radicals to be replaced by oxygen, OCO or COO, and n is 0, 1 or 2.

2. A compound as claimed in claim 1, where $R^1$ is —Y—Z—$Y^1$.

3. A compound as claimed in claim 2, where Y is a direct bond, CO or $C_2$- to $C_8$-alkylene in which nonadjacent carbon atoms may be replaced by O, CO, COO or OCO.

4. A compound as claimed in claim 2, where $Y^1$ is $C_1$- to $C_{15}$-alkyl, $C_1$- to $C_{15}$-alkoxy, $C_2$- to $C_{15}$-alkenyl, $C_2$- to $C_{15}$-alkenyloxy, acryloyloxy or methacryloyloxy.

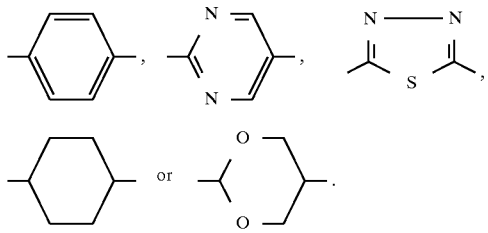

5. A compound as claimed in claim 4, where Z is

6. A compound as claimed in claim 2, where n is 0 or 1.

7. A liquid-crystalline mixture comprising as a chiral component the compound of claim 1.

8. A cholesteric liquid-crystalline coating composition comprising the compound as claimed in claim 1.

* * * * *